July 31, 1956

D. E. HOUGHTON 2,756,897

EXPANSIBLE GASKET CLOSURE

Filed Dec. 10, 1954

INVENTOR.
Daniel E. Houghton.
BY
W. J. Eccleston
ATT'RNEY

U̲n̲i̲t̲e̲d̲ ̲S̲t̲a̲t̲e̲s̲ ̲P̲a̲t̲e̲n̲t̲ ̲O̲f̲f̲i̲c̲e̲

2,756,897
Patented July 31, 1956

---

2,756,897

EXPANSIBLE GASKET CLOSURE

Daniel E. Houghton, Arlington, Va., assignor to the United States of America as represented by the Secretary of the Army Application December 10, 1954, Serial No. 474,626

18 Claims. (Cl. 220—24.5)

My invention relates to closures for containers and more particularly to closures of the type wherein an annular gasket is expanded radially outwardly into sealing engagement with the inner surface of a cylindrical neck defining an opening in the wall of a container.

The usual closure of this type comprises upper and lower members which are disposed in the container neck. One member mounts a screw on which the other is slidable and on which is threaded a nut. The nut which is sometimes the upper member and the lower member or both are formed to provide annular cam surfaces between which an expansible sealing ring is interposed. As the nut is rotated on the screw, the lower member moves upwardly toward the upper member and the opposed cam surfaces expand the ring into sealing engagement with the inner periphery of the closure neck. Guides or the like are provided to prevent relative rotation of the lower and upper member as the nut and/or screw is rotated.

The structure has the disadvantage that it requires a relatively expensive screw and nut and precludes the use of a more cheaper sheet metal cap having a threaded or bayonet slot connection with the neck for such types of closure would still require the screw and the nut to expand the gasket. Also, the prior art devices are slower in operation than a connection comprising a bayonet slot or interrupted screw threads.

With the foregoing in view, it is an object of the invention to provide an improved closure of the class described wherein the expansible gasket is expanded into sealing engagement by the act of seating a cap or plug on or in a container neck by means of bayonet slots, screw threads or the like but without the use of the usual nut and machined screw.

A further object is to provide such a closure wherein a lower member is supported in the container neck against axially inward movement and mounts an annular expansible gasket which is expanded into sealing engagement with the neck by the action of an upper member carried by a container closure as the latter is rotated to a seated position.

A further object is to provide such a closure wherein the lower member is supported in the neck by outwardly projecting means which rest on the upper edge of the neck and wherein the closure comprises a closure cap connected to the neck by bayonet slot means, screw threads or the like disposed externally of the neck.

Other objects and advantages reside in the particular structure of the invention, the structure of the several elements thereof, combinations and sub-combinations of such elements both with each other and with a container—all of which will be readily apparent to those skilled in the art upon reference to the attached drawing in connection with the following specification wherein one expression of the invention is shown, described and claimed.

Figure 1:
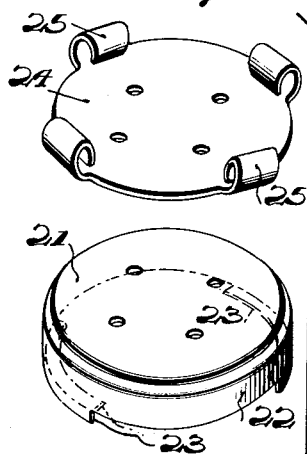
Fig. 1 is an exploded perspective view showing the elements of one embodiment of the invention.

Referring specifically to the drawing wherein like reference characters designate like parts in all views, 10 designates a wall of a container which has an opening 11 formed therein. Opening 11 is defined by a neck 12 which has its upper edge crimped to form a bead 13 which secures the neck 12 to the free upper edge of the neck of a sput or flange 14. The sput 14 is formed with any suitable means for readily releasably connecting a closure thereto. For instance, sput 14 may be formed with a pair of oppositely disposed bayonet slots 15 each having inclined cam surfaces 16, dwells 17 and stops 18. Obviously, any other well known attaching means may be utilized.

A closure according to the invention is illustrated in the drawing and comprises two main parts and a gasket, one part 20 may comprise a flat base 21 from which depends a cylindrical flange 22 having a pair of opposed bayonet slot lugs 23 extending radially inwardly of opposite lower edge portions thereof. If desired, the base 21 may be reinforced by a disc 24 which is secured atop the same and which may include any suitable tool-engaging means such as the lugs 25.

The base 21 has a circular member such as the annulus 26 fixedly secured thereto in downwardly spaced relation by any suitable means such as the spaced pins 27 which are fixedly connected to both and which may also connect the reinforcing disc 24 to the flat base 21.

Figure 4:
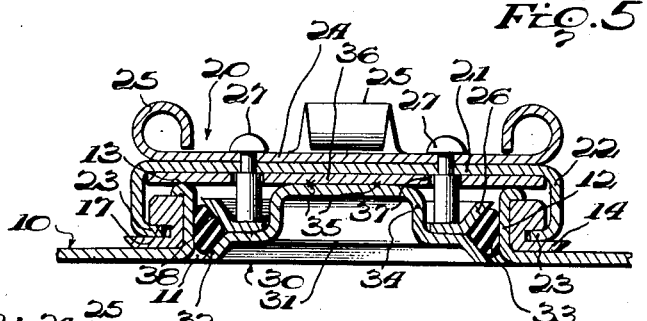
Fig. 4 is a view on the same plane as Fig. 3 but showing the parts in the container sealing position.
Figure 3:
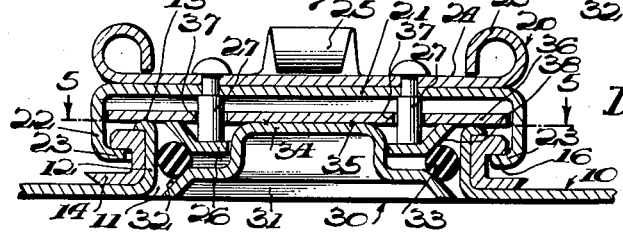
Fig. 3 is a transverse sectional view taken substantially on the plane of the line 3—3 of Fig. 2, the parts being shown in the released or non-sealing positions.

The second part of the closure is generally indicated by 30 and may comprise a gasket mount 31 which includes an annular marginal area 32 which seats a resilient, expansible ring gasket 33. The gasket mount 31 includes an upstanding axial boss 34 about which the annulus 26 is loosely disposed for axial movement relative thereto. As is clearly shown in Figs. 3 and 4, the boss 34 has fixedly secured thereto in any suitable manner, as by the spot welds 35, any suitable support means 36 which projects radially outwardly of the annulus 26 so that in use it rests atop the bead 13 of the neck 12 and limits the entrance of the gasket mount 30 therein. In the form illustrated, the support means 36 comprises a disc which is formed with openings 37 therein through which the pins 27 freely slide. Obviously, the support means 36 could assume many forms other than the disc illustrated within the scope of the invention as hereinafter claimed.

As is obvious from the foregoing, the assembled closure comprising the part 20 and the gasket mount 30 are connected together with a lost motion connection so that one may move axially relative to the other within the limits defined by the annulus 26 and the base 21. Moreover, such movement is loosely guided by the loose fit of the annulus 26 over the boss 34 and/or by the loose fit of the pins or the like 27 in the holes 37. Thus, where the support means 36 is some form other than a disc, the sole guiding would be by the boss 34. Likewise, it is conceivable that the invention could assume a form wherein the sole guiding is accomplished by the pins or the like 27.

As the gasket 33 is interposed between the annulus 26 and gasket seat 32 and also because one or both of the twain is formed as a conical cam, it is obvious that the gasket is expanded into resilient sealing engagement with the neck 12 as the annulus 26 and seat 32 move toward each other. In the form illustrated, the gasket seat 32 is formed as an upright conical cam while the undersurface of the annulus 26 is likewise formed as an inverted frustroconical cam 38. This is the preferred form but it is clear that the device will function with but a single cam as is well known in the art.

Figure 2:
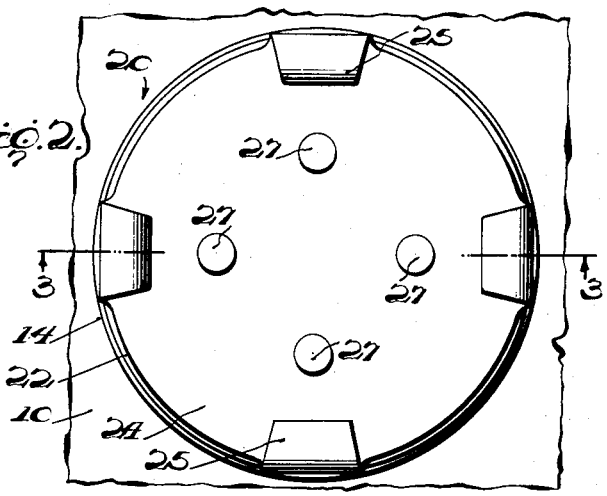
Fig. 2 is a plan view of such embodiment of the invention showing the same applied to a container opening.
Figure 5:
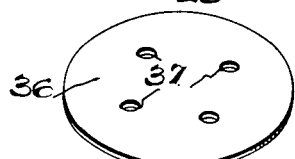
Fig. 5 is a horizontal sectional view taken substantially on the plane of the line 5—5 of Fig. 3.
Figure 5:
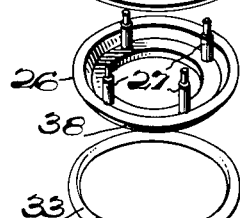
Figure 5:
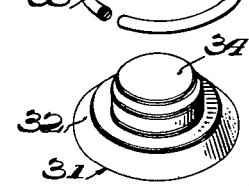
Figure 5:
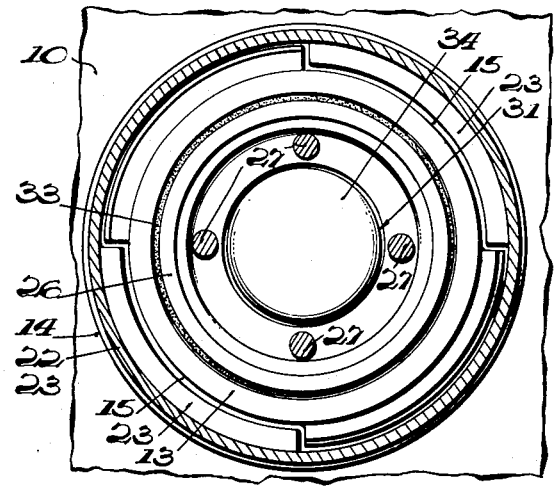

In operation, when the assembled closure is applied to the neck 12, the support 36 rests on the bead 13 and prevents further axially inward movement of the gasket mount 30 into the container opening 11, Fig. 2. Thus, as the actuating part 20 is partially rotated and drawn to the seated position of Fig. 3 by the lugs 23 and bayonet slot cams 16, the annulus 26 is forced downwardly whereby the cam surfaces 32 and 38 force the gasket 33 radially outwardly into sealing engagement with the inner periphery of the neck 12. Thus, the gasket 33 is expanded and the opening 11 is sealed by the mere act of applying the closure to the neck 12 and giving the actuating part a partial turn. No separate operation nor expensive machined parts are required.

The closure may be conveniently assembled as follows. First, the part 30 is assembled with the annulus 26 in position between the carrier 31 and support 36 and with the pins 27 fixed to the annulus and extending up through the holes 37. Then this assembly is applied to the part 20 before the bayonet slot lugs 23 are directed inwardly. Thus, in Figure 1, such lugs 23 are illustrated in full lines as they appear prior to assembly and are shown in broken lines in their final positions. Then the heads of pins 27 are peened over to secure the parts together and the lugs 23 may be bent to the broken line positions.

Moreover, while I have shown and described what is now thought to be the preferred form of the invention, it is obvious that the same is susceptible of other embodiments and expressions. Consequently, I do not limit myself to the precise structures shown and described hereinabove except as hereinafter claimed.

I claim:

1. In an expansible gasket closure for a container of the type wherein a closure cap has a threaded or the like connection with threads or the like on the exterior of an upstanding neck defining an opening in the container, and wherein the gasket is expanded by the action of seating the cap on the rim of said neck; the improvement comprising an annular, inverted frustro-conical cam fixed to said cap and depending therefrom, a substantially upright frustro-conical cam below said inverted cam, means providing a vertically sliding connection between said cap and said upright cam, both of said cams having a loose concentric fit in said neck, means on said upright cam extending radially outwardly of said inverted cam between the same and said cap for engaging the rim of said neck and supporting said upright cam therefrom, an expansible annular gasket between said cams, and said gasket being expanded into sealing engagement with said neck by the action of said cams as said inverted cam approaches said upright cam while said cap is rotated to a seated position on said neck.

2. In an expansible gasket type of seal for the neck of a container, the combination with a closure cap; of an inverted frustro-conical cam fixed to said cap in depending concentric relation, an upright frustro-conical cam below said inverted cam, means connecting said upright cam to said cap for vertical movement relative thereto and to said inverted cam, both of said cams having a free fit in said neck, an expansible annular gasket between said cams concentrically thereof, means projecting radially of said upright cam between said inverted cam and cap for seating on the rim of said neck to limit downward movement of said upright cam therein, and means for moving said inverted cam toward said upright cam so as to expand said gasket into sealing engagement with said neck.

3. In a seal for the neck or flange of a container opening, said neck or flange having a free upper edge, the combination with an expansible annular gasket; of relatively vertically movable upper and lower means for expanding said gasket therebetween, both of said means and said unexpanded gasket having a free fit in said neck or flange, stop means on said lower means for resting on said free upper edge of said neck or flange so as to limit downward movement therein of said lower means, a closure cap for said opening overlying said stop means and movable axially of said neck or flange to and from open and closed positions, actuating means rigidly connecting said cap and upper member together and operable to move said upper means downwardly toward said lower means as said cap moves toward said closed position, and cam means on at least one of said upper and lower means for engaging and expanding said gasket as said upper means moves toward said lower means.

4. In a seal for the neck or flange of an opening in a container or the like, including an expansible annular gasket the improvement comprising relatively vertically movable upper and lower means for expanding said gasket therebetween, both of said means having a free fit in said neck or flange, stop means comprising a disc fixed to said lower means, said disc being disposed above said upper means, said disc having a free edge resting atop said neck or flange to limit downward movement of said lower means in said neck, actuating means for moving said upper means downwardly toward said lower means so as to expand said gasket into sealing engagement with said neck, and a closure cap fixed to said actuating means in overlying relation to said disc.

5. The structure of claim 4, wherein said disc is formed with at least one aperture therethrough, and said actuating means for said upper means extending upwardly therefrom through said aperture.

6. In a seal for the neck or flange of an opening in a container or the like, including an expansible annular gasket the improvement comprising relatively vertically movable upper and lower means for expanding said gasket therebetween, both of said means having a free fit in said neck or flange, stop means comprising a disc fixed to said lower means, said disc being disposed above said upper means, said disc having a free edge resting atop said neck or flange to limit downward movement of said lower means in said neck, said upper means comprising an annular inverted frustro-conical cam, said lower means including a central portion extending axially upwardly through said cam, said disc being fixed to said central portion, said disc being formed with vertically directed apertures therethrough, and said actuating means for said cam comprising studs fixed thereto and extending upwardly through said apertures.

7. The structure of claim 6, there being a closure cap fixed to said studs, and means for moving said cap and cam vertically relative to said neck and lower means.

8. The structure of claim 7, wherein said last-named means includes interengaging helical means on said cap and neck.

9. The structure of claim 8, wherein said lower means includes a free lower edge formed to provide an upright frustro-conical cam engaging said gasket.

10. A closure, comprising a base, spaced means fixed to said base and depending therefrom, an annulus fixed to said spaced means in downwardly spaced relation to said base, a gasket mount below said annulus, support means fixed to said gasket mount and extending upwardly through said annulus, said support means including radially outwardly directed means overlying said annulus below said base and providing a lost motion connection between said annulus and gasket mount, an expansible ring gasket carried by said gasket mount, and means for expanding said gasket as said annulus and gasket are moved toward each other.

11. A closure, comprising a base, spaced pins fixed to said base and depending therefrom, an annulus fixed to said pins in downwardly spaced relation to said base, a disc normally resting atop said annulus, said disc being formed to be slidable on said pins between limits defined by said base and annulus, a gasket mount fixed to said disc and depending therefrom below said annulus, an expansible ring gasket carried by said mount, and actuating means for expanding said gasket upon relative movement of said mount and annulus toward each other.

12. A closure, comprising a base, spaced means fixed to said base and depending therefrom, annular means fixed to said spaced means in downwardly spaced relation to said base, a circular member providing a gasket mount below said annular means, supports fixed to said circular member and including means extending radially outwardly between said base and said annular means, said supports connecting said circular member to said annular means for limited relative axial movement toward and away from each other, an expansible ring gasket carried by said circular member concentrically thereof between the same and said annular means, and means for expanding said gasket upon relative axial movement of said circular member and annular means toward each other.

13. A closure, comprising a circular member including an annular marginal portion providing a gasket seat and an upwardly extending axial boss, an expansible ring gasket on said marginal portion concentrically of said boss, a disc fixed to said boss and including marginal portions overlying said gasket, an annulus loosely surrounding said boss between said disc and gasket, said annulus being movable axially of said boss between said disc and gasket seat, actuating means fixed to said annulus in overlying relation to said disc for moving said annulus toward and away from said gasket seat, and means for expanding said gasket as said annulus moves toward said gasket seat.

14. A closure according to claim 13, wherein said actuating means comprises a closure cap, spaced pins fixedly connecting said cap and annulus together in vertically spaced relation, and said disc being formed with holes therethrough slidably receiving said pins therein.

15. A closure according to claim 14, wherein said disc includes a marginal portion located concentrically outwardly of said annulus, and said cap including a depending cylindrical flange concentrically outwardly of said disc and including a lower portion disposed below said disc.

16. A closure according to claim 15, wherein said lower portion of said flange includes means for readily detachably connecting the same to a container in concentric relation to a container opening.

17. In a seal for the neck or flange of an opening in a container or the like, including an expansible annular gasket the improvement comprising relatively vertically movable upper and lower means for expanding said gasket therebetween, both of said means having a free fit in said neck or flange, stop means comprising a disc fixed to said lower means, said disc being disposed above said upper means, said disc having a free edge resting atop said neck or flange to limit downward movement of said lower means in said neck, said disc being formed with at least one aperture therethrough, actating means for moving said upper means downwardly toward said lower means so as to expand said gasket into sealing engagement with said neck, said actuating means extending upwardly through said aperture in said disc, a closure cap fixed to said actuating means, and helical interengaging means on said cap and neck for driving said actuating means upon rotation of said cap on said neck.

18. In a seal for the neck or flange of an opening in a container or the like, including an expansible annular gasket the improvement comprising relatively vertically movable upper and lower means for expanding said gasket therebetween, both of said means having a free fit in said neck or flange, stop means comprising a disc fixed to said lower means, said disc being disposed above said upper means, said disc having a free edge resting atop said neck or flange to limit downward movement of said lower means in said neck, said upper means comprising an annular inverted frustro-conical cam, said lower means including a central portion extending axially upwardly through said cam, said disc being fixed to said central portion, and actuating means for moving said upper means downwardly toward said lower means so as to expand said gasket into sealing engagement with said neck.

References Cited in the file of this patent

UNITED STATES PATENTS

| | | |
|---|---|---|
| 303,558 | Campbell | Aug. 12, 1884 |
| 2,564,232 | Rausenberger | Aug. 14, 1951 |